UNITED STATES PATENT OFFICE.

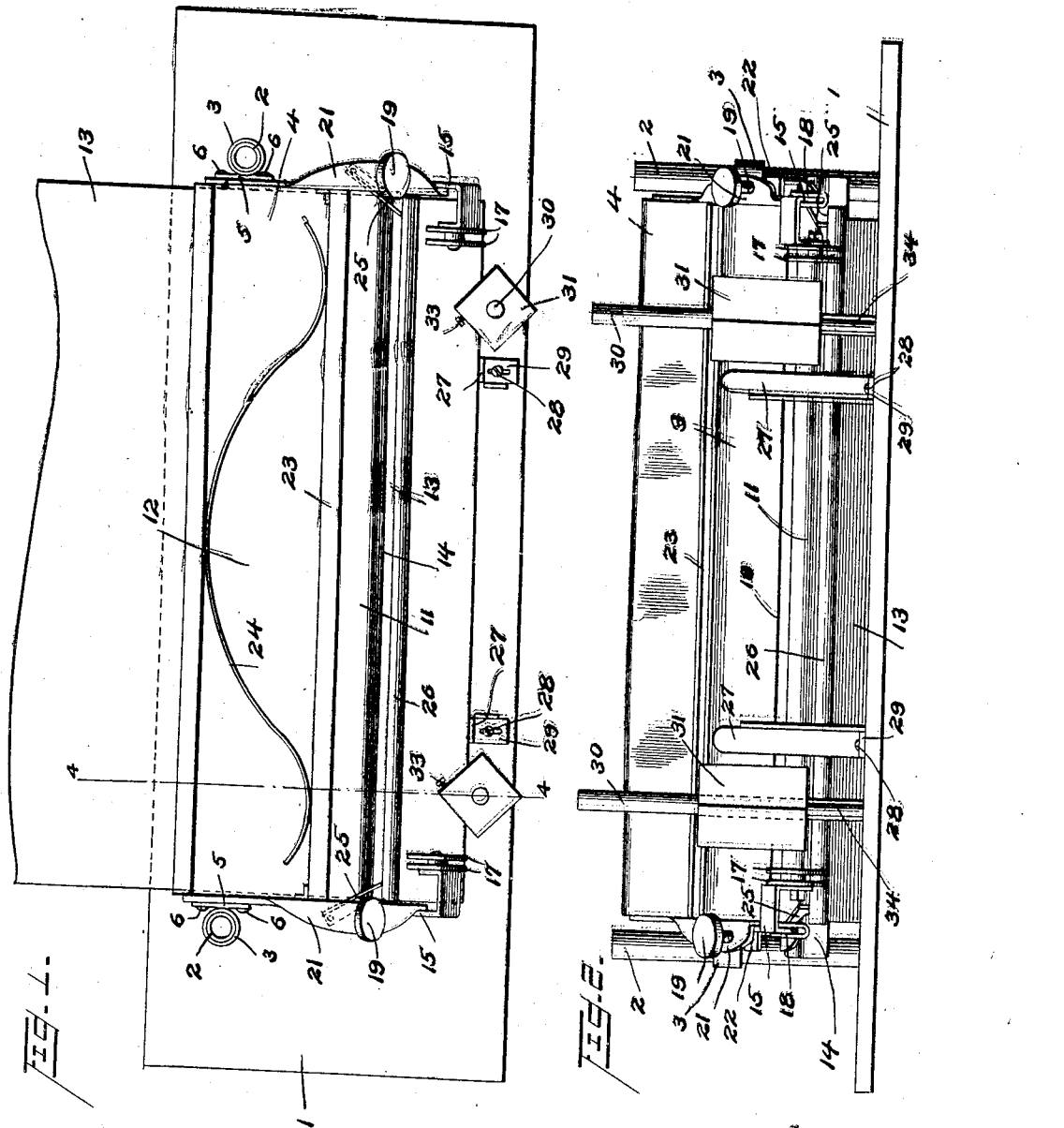

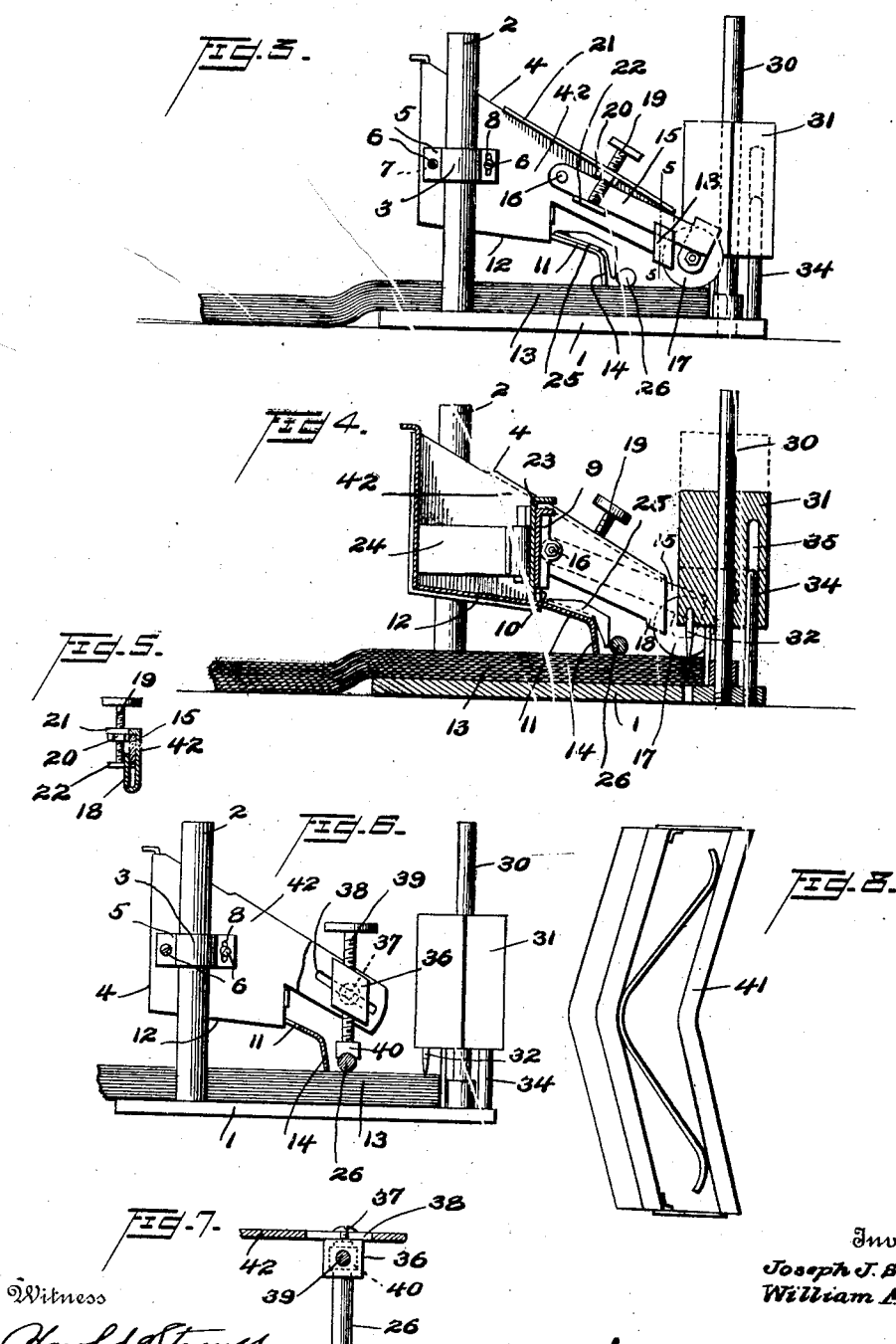

JOSEPH J. SLEEPER, OF MOORES, PENNSYLVANIA, AND WILLIAM MILLS, OF PLEASANTVILLE, NEW JERSEY; SAID MILLS ASSIGNOR TO SAID SLEEPER.

WRAPPER-PASTING DEVICE.

1,347,182.  Specification of Letters Patent.  Patented July 20, 1920.

Application filed April 11, 1917. Serial No. 161,133.

*To all whom it may concern:*

Be it known that we, JOSEPH J. SLEEPER and WILLIAM MILLS, citizens of the United States, residing at Moores, county of Delaware, and State of Pennsylvania, and Pleasantville, county of Atlantic, and State of New Jersey, respectively, have invented certain new and useful Improvements in Wrapper-Pasting Devices, of which the following is a specification.

Our invention relates to improvements in wrapper pasting devices, the object of the invention being to provide means for regulating the distribution of paste so as to properly deposit the desired amount on the wrappers.

A further object is to provide an improved construction of paste holder with an improved arrangement of distributing roll, which evenly distributes the paste, and insures a uniform application of paste to each wrapper.

A further object is to provide improved means for adjusting the angular disposition of the paste holder to regulate the flow of paste.

A further object is to provide improved means for confining the paste, and regulating the width of the paste application.

A further object is to provide improved pin-holding weights which have an improved mounting, and prevent the wrappers from being drawn off the pile except one at a time.

A further object is to provide a device of the character stated, which is an improvement upon the structures disclosed in Patent #1,033,282, granted July 23, 1912, and upon the structures disclosed in Patent #1,084,825, granted June 20, 1914.

With these and other objects in view the invention consists in certain novel features of construction and combinations and arrangements of parts as will be more fully hereinafter described and pointed out in the claims.

In the accompanying drawings:

Figure 1 is a top plan view, illustrating our improvements.

Fig. 2 is an elevation showing one side of the paste holder.

Fig. 3 is an end view.

Fig. 4 is a view in section on the line 4—4 of Fig. 1.

Fig. 5 is a fragmentary view in section on the line 5—5 of Fig. 3, and

Figs. 6, 7 and 8 are views illustrating modifications.

1 represents a base plate having two vertical standards 2, 2, fixed to the plate and receiving guide sleeves 3, 3, secured to the ends of our improved paste holder 4. The paste holder 4 is of general oblong shape, and the guide sleeves 3 are fixed to or integral with brackets 5, the latter connected by bolts 6 to the ends of paste holder 4. Each bracket 5 is secured by two bolts 6.

One bolt 6 of each pair is located in a round hole 7 and operates as a journal bolt, while the other bolt 6 extends through a slot 8 in the bracket 5 to allow the paste holder a certain amount of pivotal movement to regulate the flow of paste, as will more fully hereinafter appear.

The rear wall 9 of paste holder 4 is provided throughout its length at its lower edge with an outlet 10 through which the paste flows from the paste holder onto an inclined platform 11. As a matter of fact, the bottom 12 of paste holder 4 inclines toward the outlet 10 so that the paste when permitted, flows by gravity onto the inclined platform 11 and onto the wrappers indicated by the reference numeral 13 on plate 1.

The inclined platform 11 may of course be variously shaped, but we preferably bend the platform at its extreme edge so as to provide a lip 14 which is located upon or in close proximity to the upper wrapper 13.

It will be noted, particularly by reference to Fig. 3, that the ends 42 of the paste holder 4 extend beyond the rear wall 9 for a purpose which will now be explained.

Arms 15 are pivotally connected to the ends 42 of paste holder 4 by means of rivets 16. The free ends of the arms 15 carry rollers 17 which bear upon wrappers 13, and upwardly projecting tongues 18 on the ends of the paste holder 4, guide the pivotal movement of arms 15.

Set screws 19 are located in threaded blocks 20 fixed to flanges 21 on the ends of the paste holder 4. The lower ends of these set screws 19 bear against lugs 22 on arms 15. By adjusting the screws 19, the paste holder 4 can be tilted, the bolts 6 in the hole 7 operating as journals or pivot pins.

This tilting or angular adjustment of the paste holder varies the angle of the inclined platform 11, and hence varies the rapidity of the feed of the paste.

A sliding gate or cut-off 23 is located inside the paste holder 4 against rear wall 9, and is held in this position by a bow-spring 24. The gate 23 operates to cut off the outlet 10, and can be adjusted vertically to permit the necessary quantity of paste to escape.

Platform 11 supports two pivoted guides 25. These guides are pivotally connected at one end to the platform 11, and their angular disposition relative to each other can be varied so as to vary the width of the paste application. In other words, the free ends of the guides 25 can be swung toward or away from each other, and hence shorten or lengthen the width of paste applied to the wrappers.

These guides 25 also operate to hold a distributing roller 26 away from the inclined platform 11.

The roller 26 rests upon the wrappers 13, and operates to evenly distribute the paste as the wrappers are drawn away from under the paste holder. The movement of the wrappers as they are drawn outwardly from under the paste holder serves to hold the roller against the ends of guides 25, and the roller spreads or smears the paste, and insures an even distribution.

On plate 1 we provide a pair of uprights 27 which are adjustably secured by screws 28 projected through slotted feet 29 on the lower ends of the uprights 27 and screwed into the plate 1. These uprights 27 operate as abutments against which the ends of the wrappers 13 are held. The plate 1 also supports a pair of posts 30 on which weights 31 are vertically movable.

These weights 31 carry in their lower ends, pins 32 which are secured by set screws 33 and are adapted to puncture the upper wrappers 13, preventing more than a single wrapper from being removed at a time.

The weights 31 are held against rotary movement by relatively short posts 34 which are normally positioned in longitudinal recesses 35 in the bottom of the weights. The shorter posts 34 also perform the function of supporting the weights in an elevated position, as the weights can be elevated to the point where the shorter posts 34 are out of the recesses 35, when the weights can be turned slightly and be supported on the top of post 34 as indicated by dotted lines in Fig. 4.

In the modification illustrated in Figs. 6 and 7, we dispense with the pivoted arms 15 and adjustably secure blocks 36 to the ends of the paste holder by means of screws 37 which are movable in slots 38 to allow the blocks a certain amount of adjustment.

The blocks 36 have screw-threaded openings therein to receive set screws 39 vertically positioned, and carrying swiveled recessed blocks 40 at their lower ends. These blocks 40 are recessed to engage the roller 26 and serve the double function of spacing the roller 26 from the inclined platform 11, and also permit the adjustment of the paste holder to vary the inclination or angular disposition of the inclined platform 11, and hence regulate the feed of paste.

In Fig. 8, we illustrate more or less diagrammatically, a paste holder 41 which is of a different shape from paste holder 4, and we would have it understood that we might make the paste holders of any shape desired, according to the use for which it is to be put.

Various other slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having fully described our invention what we claim as new and desire to secure by Letters Patent is:

1. A device of the character described, comprising a paste holder having a paste outlet, an inclined platform communicating with the outlet and over which the paste is fed from the paste holder and side guide therefor, and a roller located adjacent to but spaced from the said inclined platform.

2. A device of the character described, comprising a paste holder having an outlet in one wall, and an inclined platform, constituting a continuance of the bottom of the paste holder, and operating to guide the paste as it flows from the paste holder, guides on said platform movable relative thereto to regulate the width of the paste distribution, and a roller spaced from the inclined platform by said guides.

3. A device of the character described, comprising a paste holder having an outlet in one wall, a distributing roller, and an inclined platform, constituting a continuance of the bottom of the paste holder, and operating to guide the paste to the material being pasted as it flows from the paste holder, free from the distributing roller.

4. A device of the character described, comprising a paste holder having an opening in one wall and a platform in front of said opening for paste distribution, in combination with guides about said platform movable relatively to each other to regulate the width of paste distribution and a roller spaced in front of the platform.

5. A device of the character described, comprising a plate adapted to receive wrappers thereon, distributing means engaging the material to be pasted, a paste holder located above the plate and having an inclined platform adjacent its outlet, guiding the paste on to the wrappers, free from the distributing means and means for regulating the feed of paste over the platform.

6. A device of the character described, comprising a plate adapted to receive wrappers thereon, distributing means engaging the material to be pasted, a paste holder located above the plate and having an inclined platform adjacent its outlet, guiding the paste on to the wrappers, free from the distributing means and a sliding gate in the paste holder adapted to control the outlet of paste on to the platform.

7. In combination, a paste holder, a roller upon which the paste holder is adapted to rest against the paper, a guide for normally maintaining the angle of inclination of the body of the paste holder and an adjustment for altering the normal angle of inclination.

8. In combination, a paste holder normally intended to have an inclined bottom, a roller and guide positioning the paste holder and determining its vertical height above the paper and an adjustment between the roller and the body of the paste holder, altering the angle of inclination of the body of the paste holder with respect to the horizontal.

9. The combination with a supporting base plate, of a paste holder mounted to move vertically above the plate, an inclined platform communicating with the outlet of the paste holder, and means for varying the incline or angular disposition of the platform and paste holder.

10. The combination with a supporting base plate, of a paste holder mounted to move vertically above the plate, an inclined platform communicating with the outlet of the paste holder, arms pivotally connected to the paste holder and having rollers at their free ends adapted to bear on the wrappers to be pasted, and set screws carried by the paste holder, engaging the said arms, and adapted to vary the inclined or angular disposition of the paste holder and its inclined platform.

11. The combination with a supporting plate, standards on the plate, a paste holder, brackets movably connected to the ends of the paste holder and guided on the standards, an inclined platform communicating with the outlet of the paste holder, and means for inclining the paste holder relative to the brackets, whereby the angular disposition of the platform can be varied to regulate the feed of paste.

In testimony whereof we have signed our names to this specification in the presence of two subscribing witnesses.

JOSEPH J. SLEEPER.
WILLIAM MILLS.

Witnesses:
KATHRYN A. SUMMERS,
ELEANOR F. MURRAY.